— (12) United States Patent
Kosuge et al.

(10) Patent No.: US 8,120,704 B2
(45) Date of Patent: Feb. 21, 2012

(54) IMAGE DISPLAY APPARATUS, SIGNAL PROCESSING APPARATUS, IMAGE PROCESSING METHOD, AND COMPUTER PROGRAM PRODUCT

(75) Inventors: Shoji Kosuge, Kanagawa (JP); Mikio Ishii, Kanagawa (JP); Hiroshi Higuchi, Kanagawa (JP); Masahiro Take, Kanagawa (JP)

(73) Assignee: Sony Corporation, Tokyo (JP)

( * ) Notice: Subject to any disclaimer, the term of this patent is extended or adjusted under 35 U.S.C. 154(b) by 1316 days.

(21) Appl. No.: 11/803,500

(22) Filed: May 15, 2007

(65) Prior Publication Data

US 2007/0268402 A1 Nov. 22, 2007

(30) Foreign Application Priority Data

May 17, 2006 (JP) ................ P2006-137311

(51) Int. Cl.
H04N 7/01 (2006.01)
(52) U.S. Cl. ........................................ 348/448
(58) Field of Classification Search .............. 348/448, 348/441, 458, 459, 725, 790, 791, 800
See application file for complete search history.

(56) References Cited

U.S. PATENT DOCUMENTS

| 5,864,369 | A | * | 1/1999 | Swan | 348/448 |
| 6,108,047 | A | * | 8/2000 | Chen | 348/581 |
| 6,392,709 | B1 | * | 5/2002 | Orito | 348/569 |
| 6,570,581 | B1 | * | 5/2003 | Smith | 345/632 |
| 7,667,772 | B2 | * | 2/2010 | Heo | 348/448 |
| 2005/0237287 | A1 | * | 10/2005 | Kitamura et al. | 345/87 |

FOREIGN PATENT DOCUMENTS

| JP | 63-179685 | 7/1988 |
| JP | 4-95479 | 3/1992 |
| JP | 8-221039 | 8/1996 |
| JP | 10-336597 | 12/1998 |
| JP | 2003-169302 | 6/2003 |
| JP | 2004-266393 | 9/2004 |

* cited by examiner

*Primary Examiner* — Paulos Natnael
(74) *Attorney, Agent, or Firm* — Frommer Lawrence & Haug LLP; William S. Frommer; Thomas F. Presson

(57) ABSTRACT

An image display apparatus includes an interlaced-to-progressive converter configured to receive input of interlaced signals and to convert the interlaced signals into progressive signals including interpolated pixels generated by interpolation; a level converter configured to adjust output levels of the interpolated pixels included in the progressive signals generated by the interlaced-to-progressive converter; and a display unit employing a frame-holding display method, configured to output an image obtained through the level conversion by the level converter.

11 Claims, 9 Drawing Sheets

IMAGE DISPLAY APPARATUS, SIGNAL PROCESSING APPARATUS, IMAGE PROCESSING METHOD, AND COMPUTER PROGRAM PRODUCT

CROSS REFERENCES TO RELATED APPLICATIONS

The present invention contains subject matter related to Japanese Patent Application JP 2006-137311 filed in the Japanese Patent Office on May 17, 2006, the entire contents of which are incorporated herein by reference.

BACKGROUND OF THE INVENTION

1. Field of the Invention

The present invention relates to image display apparatuses, signal processing apparatuses, image processing methods, and computer program products. More specifically, the present invention relates to an image display apparatus, a signal processing apparatus, an image processing method, and a computer program product with which interlaced-to-progressive (IP) conversion is executed to convert interlaced signals into progressive signals for output to a display.

2. Description of the Related Art

As opposed to CRT displays, which employ dot-sequential impulse driving, flat panel displays (FPDs) implemented by liquid crystal displays (LCDs) or organic electroluminescence (EL) displays employ frame-holding display methods. For example, with a typical frame frequency of 60 Hz, a flat panel display holds the same image during each frame display period (1/60 sec=16.7 msec) over the entire display screen.

Most content or broadcasting signals for displaying images are generated in the form of interlaced image data compatible with CRT displays. More specifically, in interlaced image content, each image displayed on the horizontal scanning lines of a CRT display is formed of two fields. First, every other horizontal scanning line is scanned from top to bottom in the first field, and then, every other horizontal scanning line that has not been scanned is scanned from top to bottom in the second field, whereby an image of one frame is displayed.

When such interlaced image content is displayed on a display apparatus that employs a frame-holding display method, such as an LCD, lines carrying display image signals and lines not carrying display image signals occur alternately in each display frame, so that flicker becomes apparent and luminance is reduced to half. In order to solve this problem, interlaced signals are converted into progressive signals, i.e., IP conversion is executed.

As opposed to interlaced scanning, in which every other horizontal scanning line is scanned from the top of the screen, progressive scanning sequentially scans a plurality of horizontal scanning lines (horizontal display lines) forming the screen. The progressive scanning provides image signals of all the lines.

When IP conversion is executed to convert interlaced signals into progressive signals, signals of lines not carrying signals included in the interlaced signals are generated by interpolation. The interlaced signals are converted into progressive signals using the pseudo-signals generated by interpolation, whereby an image corresponding to the progressive signals having signals for all the pixels is displayed. IP conversion is described, for example, in Japanese Unexamined Patent Application Publication No. 8-221039.

However, when IP conversion is executed to convert interlaced signals into progressive signals, pixel values of pixels that do not actually exist are estimated on the basis of spatially or temporally neighboring pixels, so that the original interlaced signals are not reproduced as they are. Thus, a viewer is presented with content altered with pseudo-pixel values. This might be inconvenient for a user wishing for playback of original content as it is.

In this case, in order to check the original content represented by the interlaced image signals, laborious processing arises, such as obtaining interlaced signals before IP conversion and displaying an image corresponding to the interlaced signals on a CRT display.

SUMMARY OF THE INVENTION

It is desired to provide an image display apparatus, a signal processing apparatus, an image processing method, and a computer program product that allow displaying a progressive image and displaying original content reproduced as it is, by controlling display of interpolated pixels generated through interpolation by IP conversion.

According to an embodiment of the present invention, there is provided an image display apparatus including an interlaced-to-progressive converter configured to receive input of interlaced signals and to convert the interlaced signals into progressive signals including interpolated pixels generated by interpolation; a level converter configured to adjust output levels of the interpolated pixels included in the progressive signals generated by the interlaced-to-progressive converter; and a display unit employing a frame-holding display method, configured to output an image obtained through the level conversion by the level converter.

The interlaced-to-progressive converter may be configured to execute frame-rate up-conversion of input image signals by a factor of n to generate progressive signals having a frame rate increased by a factor of n, where n is an integer greater than or equal to two.

The image display apparatus may further include a user input unit configured to allow input a setting value for setting an execution level of the adjustment of the output levels by the level converter. In this case, the level converter is configured to adjust the output levels of the interpolated pixels according to the setting value input via the user input unit.

The level converter may be configured to adjust the output levels of the interpolated pixels included in the progressive signals generated by the IP converter within a range of 0% to 100% of input levels thereof.

The level converter may include a signal selector configured to output gains associated with output periods of original lines corresponding to the input interlaced signals and interpolated lines composed of interpolated pixel signals, according to control signals associated with individual output line display periods at the display unit, and a multiplier configured to convert levels of the signals output from the interlaced-to-progressive converter, according to the gains output from the signal selector.

The display unit employing the frame-holding display method may be formed of a liquid crystal display or an organic electroluminescence display.

According to another embodiment of the present invention, there is provided a signal processing apparatus that generates image signals, the signal processing apparatus including an interlaced-to-progressive converter configured to receive input of interlaced signals and to convert the interlaced signals into progressive signals including interpolated pixels generated by interpolation; and a level converter configured to adjust output levels of the interpolated pixels included in the progressive signals generated by the interlaced-to-progressive converter.

The interlaced-to-progressive converter may be configured to execute frame-rate up-conversion of input image signals by a factor of n to generate progressive signals having a frame rate increased by a factor of n, where n is an integer greater than or equal to two.

The level converter may be configured to adjust the output levels of the interpolated pixels according to a setting value input via a user input unit.

The level converter may be configured to adjust the output levels of the interpolated pixels included in the progressive signals generated by the IP converter within a range of 0% to 100% of input levels thereof.

The level converter may include a signal selector configured to output gains associated with output periods of original lines corresponding to the input interlaced signals and interpolated lines composed of interpolated pixel signals, according to control signals associated with individual output line display periods at the display unit, and a multiplier configured to convert levels of the signals output from the interlaced-to-progressive converter, according to the gains output from the signal selector.

According to another embodiment of the present invention, there is provided an image processing method for image processing executed by an image display apparatus, the image processing method including the steps of causing an interlaced-to-progressive converter to receive input of interlaced signals and to convert the interlaced signals into progressive signals including interpolated pixels generated by interpolation; and causing a level converter to adjust output levels of the interpolated pixels included in the progressive signals to thereby generate signals that are output to a display.

According to another embodiment of the present invention, there is provided a computer program product for causing an image display apparatus to execute image processing, the computer program product comprising the steps of causing an interlaced-to-progressive converter to receive input of interlaced signals and to convert the interlaced signals into progressive signals including interpolated pixels generated by interpolation; and causing a level converter to adjust output levels of the interpolated pixels included in the progressive signals to thereby generate signals that are output to a display.

The computer program product according to the embodiment can be provided, for example, to a general-purpose computer system that is capable of executing various program codes, via a storage medium or a communication medium that provides a program in a computer-readable form, for example, a storage medium such as a compact disc, a floppy disc, or a magneto-optical disc, or a communication medium such as a network. By providing the computer program product carrying a program in a computer-readable form, processing can be executed on the computer system according to the program.

Further objects, features, and advantages of the present invention will become apparent from detailed description of embodiments with reference to the accompanying drawings. A system in this specification refers to a logical combination of a plurality of apparatuses, and is not limited to one in which constituent apparatuses are disposed within the same case.

According to these embodiments of the present invention, a level converter is provided to adjust display levels of interpolated pixels generated by conversion of interlaced signals into progressive signals so that it is possible to display the interpolated pixels by controlling the levels in a range of, for example, ×0 to ×1. Accordingly, for example, by displaying pixel lines generated by interpolation without reducing the levels, a progressive image can be displayed without causing flicker or reduction of luminance. Furthermore, by selectively displaying pixel lines generated by interpolation at reduced levels, original content composed only of interlaced signals can be reproduced and displayed as it is.

DESCRIPTION OF THE PREFERRED EMBODIMENTS

Now, image display apparatuses, signal processing apparatuses, image processing methods, and computer program products according to embodiments of the present invention will be described with reference to the drawings, in the following order of topics:

1. IP Conversion
2. Details of Apparatus Configuration and Operation

1. IP Conversion

First, an overview of ordinary IP conversion will be described. As described earlier, when an interlaced image formed by scanning every other scanning line is displayed on a frame-holding display apparatus, such as a liquid crystal display, pixel values on lines where image signals are missing are determined by interpolation to form a progressive image with full lines. That is, IP conversion is executed.

Figure 1:
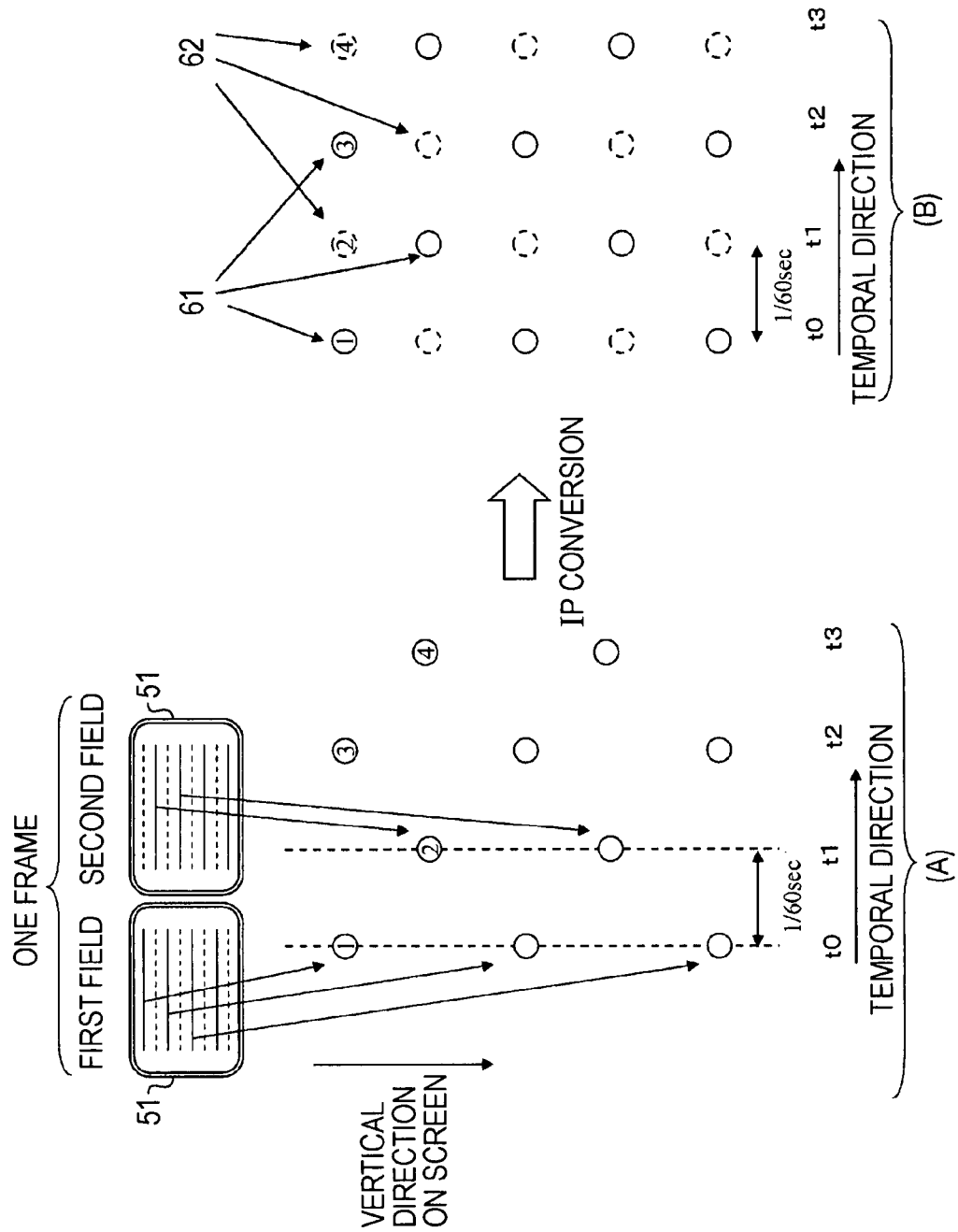
FIG. 1 is a diagram for explaining IP conversion.

FIG. 1 is a diagram showing a scheme of ordinary IP conversion. In FIG. 1, part (A) shows an example of interlaced output before IP conversion, indicating output pixel lines at time t0 to t4 from the left. For example, at time t0, pixel values on every other line of a display unit 51 are output, and at next time t1, pixel values of lines from which pixel values are not output at time t0 are output.

Interlaced signals output at time t0 correspond to first-field signals, interlaced signals output at time t1 correspond to second-field signals, and the signals of these two fields constitute one frame.

When the interlaced signals are displayed on a display unit that employs a frame-holding display method, as described earlier, lines with display image signals and lines without display image signals occur alternately, so that flicker becomes apparent and luminance is halved. In order to overcome this problem, IP conversion is executed to convert interlaced signals into progressive signals.

In FIG. 1, part (B) shows an image obtained through IP conversion. As shown in part (B), original lines 61 with original display image signals and interpolated lines 62 without original display image signals are located alternately in the vertical direction in an image displayed at each timing. Furthermore, the original lines 61 and the interpolated lines 62 are also located alternately in the temporal direction.

Figure 2:
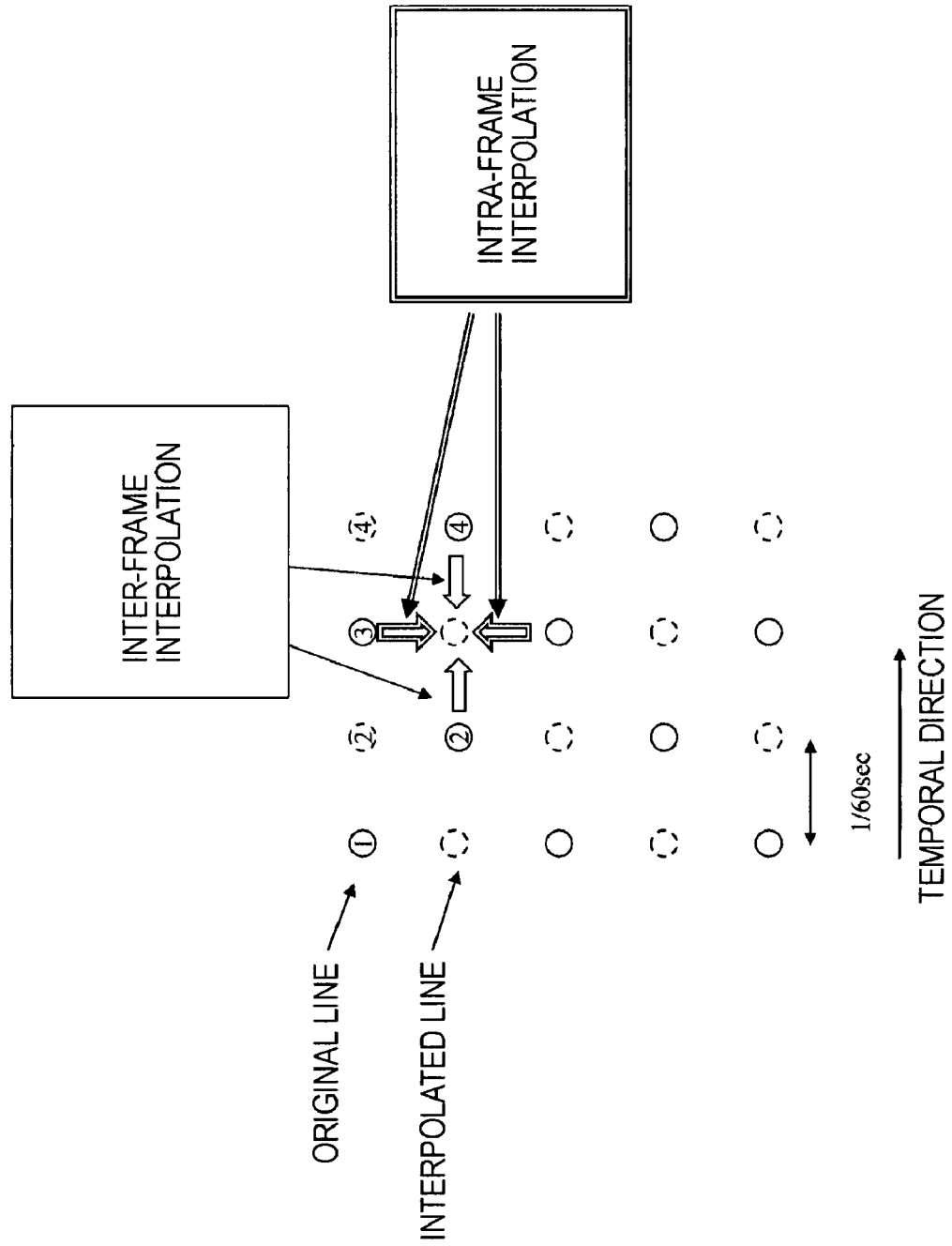
FIG. 2 is a diagram for explaining IP conversion.

Now, methods of IP conversion will be described with reference to FIG. 2. As shown in FIG. 2, methods of IP conversion include inter-frame interpolation and intra-frame interpolation. The inter-frame interpolation carries out interpolation on the basis of pixel values of corresponding pixels on lines of temporally preceding and succeeding frames. The intra-frame interpolation carries out interpolation on the basis of pixel values of neighboring pixels on upper and lower lines within the same frame. The intra-frame interpolation and the inter-frame interpolation are used by switching or in combination, and the switching or the ratio of combination is controlled in real time according to image features. More specifically, for example, pixel values of interpolation pixels are determined by obtaining motion information and changing the ratio of combination according to the motion information.

As described above, pixel values of interpolated pixels are determined on the basis of pixel values of corresponding pixels along the temporal direction or within the same frame, for example, by calculating an average of the pixel values of neighboring pixels. However, depending on the content of the interlaced image, the pixel values determined by the interpolation described above might be different from pixel values corresponding to the actual image. This could degrade image quality.

The pixels generated by the interpolation described above are pseudo-pixels having pixel values estimated on the basis of pixel values of neighboring pixels within the same frame or along the temporal direction. Thus, a viewer is presented with content altered with pseudo-pixel values. This might be inconvenient for a user wishing for playback of original content as it is.

2. Details of Apparatus Configuration and Operation

Next, apparatus configuration and operation according to an embodiment of the present invention will be described. In an image display apparatuses according to an embodiment of the present invention, implemented as an LCD, an organic EL display, or any other display apparatus that employs a frame-holding display method, display of interpolated pixels generated by IP conversion is controlled by controlling the output levels of the interpolated pixels. This allows playback and display of original content as it is as well as display of an image corresponding to progressive signals.

More specifically, in an arrangement where IP conversion is executed to convert interlaced signals into progressive signals and an image corresponding to the progressive signals is displayed on a frame-holding display, such as a liquid crystal display, the output levels of interpolated pixels generated by the IP conversion are controlled.

Figure 3:
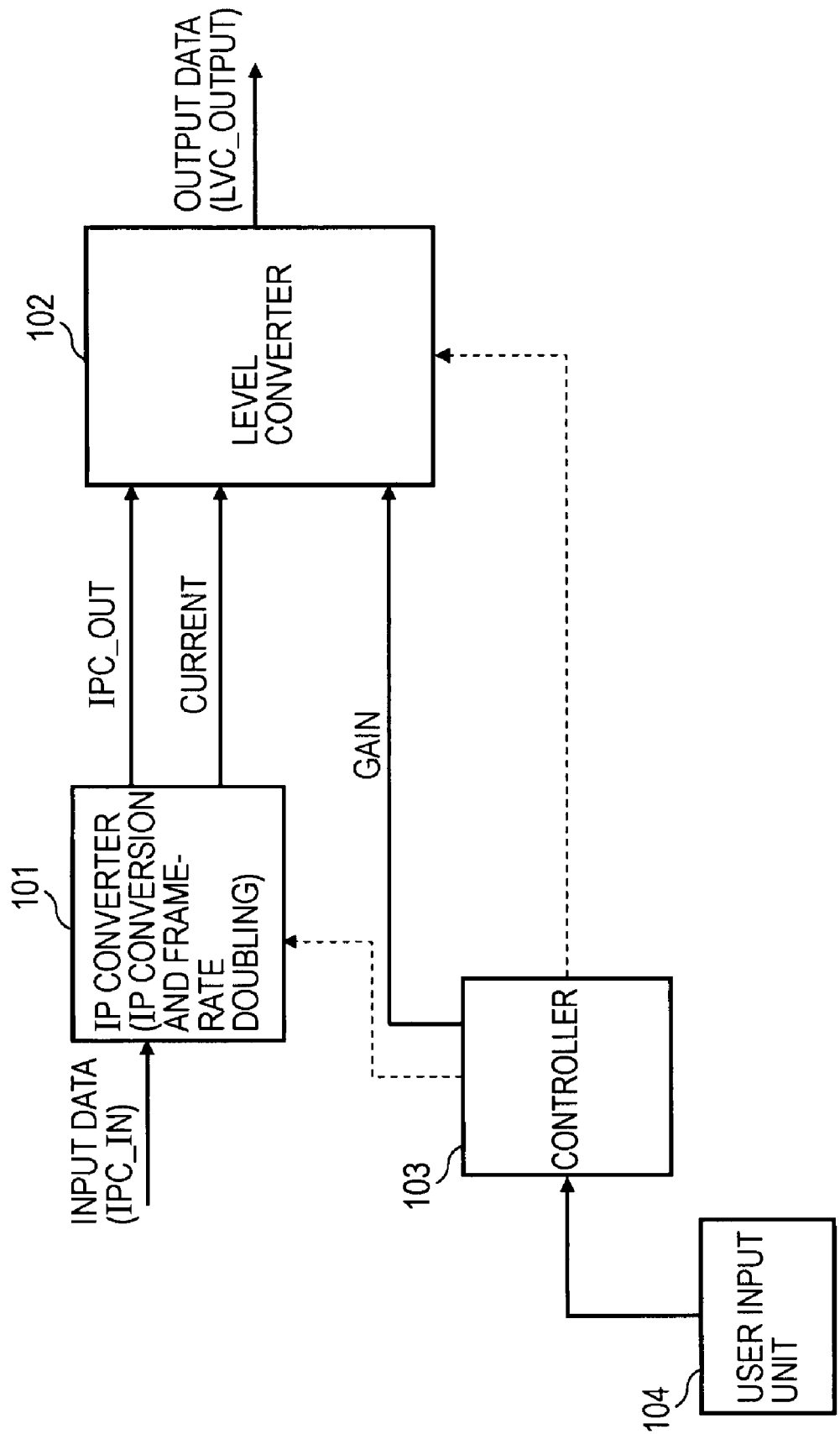
FIG. 3 is a block diagram of a signal processing circuit in an image display apparatus according to an embodiment of the present invention.
Figure 4:
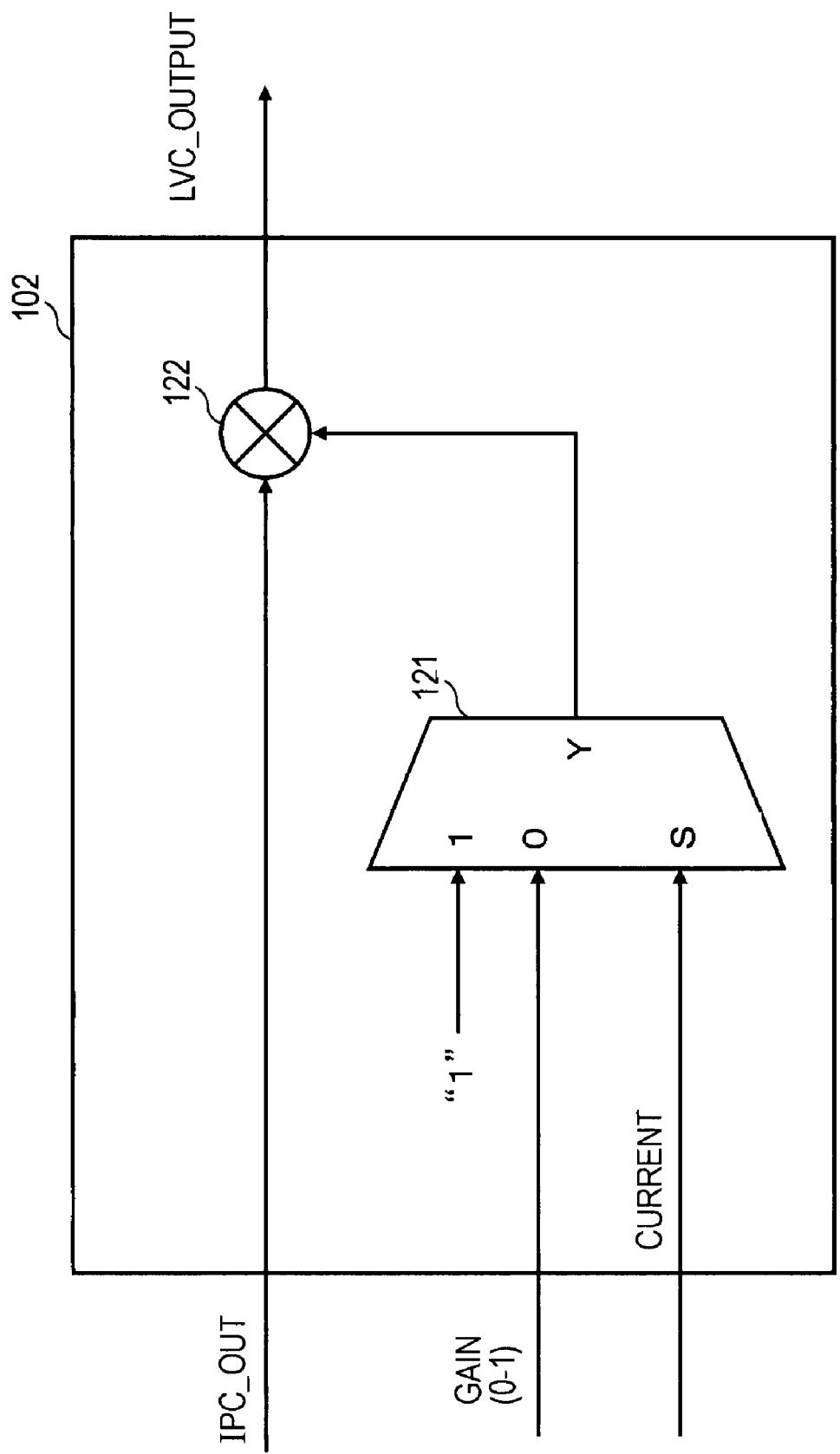
FIG. 4 is a diagram showing an example configuration of a level converter in the image display apparatus according to the embodiment.

Now, the operation according to this embodiment will be described in detail with reference to FIG. 3 and subsequent figures. FIG. 3 is a block diagram showing a signal processing circuit in the image display apparatus according to this embodiment. As shown in FIG. 3, the image display apparatus according to this embodiment includes an IP converter 101, a level converter 102, a controller 103, and a user input unit 104. FIG. 4 shows an example circuit of the level converter 102. As shown in FIG. 4, the level converter 102 includes, for example, a signal selector 121 and a multiplier 122.

In the configuration shown in FIG. 3, input data (IPC_IN) input to the IP converter 101 is interlaced signals. First, the input data (IPC_IN) is input to the IP converter 101, where IP conversion is executed, i.e., the interlaced signals are converted into progressive signals. The IP conversion in the IP converter 101 is executed as described earlier with reference to FIGS. 1 and 2.

More specifically, as described with reference to FIG. 2, progressive signals are generated by determining pixel values of interpolated pixels by interpolation. The interpolation is executed by switching or combination of two types of interpolation, namely, the inter-frame interpolation that carries out interpolation using lines of temporally preceding and succeeding frames and the intra-frame interpolation that carries out interpolation using upper and lower lines within the same frame, pixel values of interpolated pixels are determined, and the switching or the ratio of combination is controlled in real time according to image features such as motion vector information.

In executing IP conversion, the IP converter 101 receives input of a 60-Hz interlaced image, and doubles the frame rate of the interlaced image on a line-by-line basis to output a 60-Hz progressive image.

Figure 5:
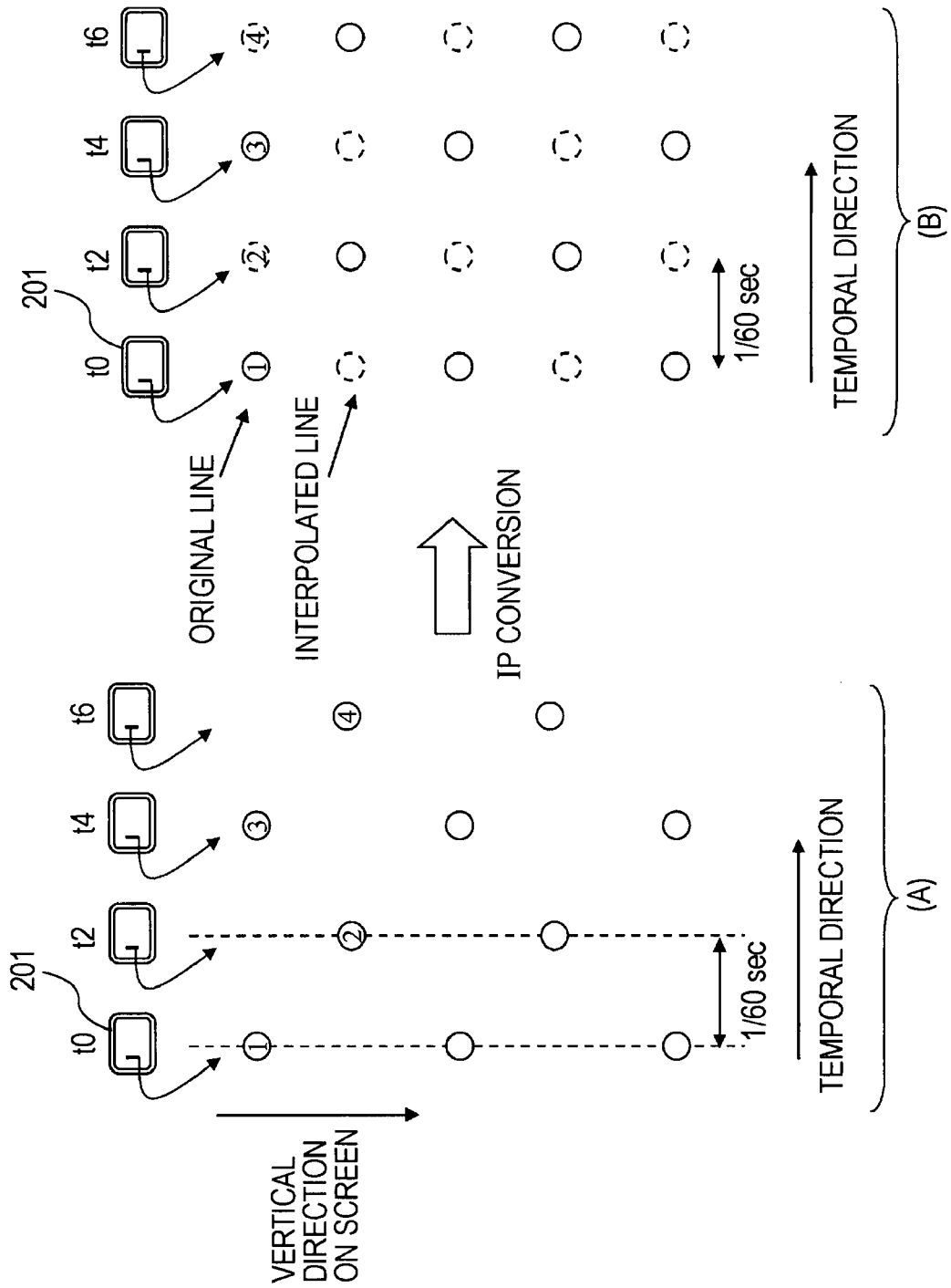
FIG. 5 is a diagram for explaining IP conversion.

Now, processing executed by the IP converter 101 will be described with reference to FIGS. 5 and 6. In FIG. 5, part (A) shows the composition of interlaced signals to be processed. This corresponds to the signals described earlier with reference to part (A) of FIG. 1. Part (A) of FIG. 5 shows vertical sets of display pixels in four frames at t0, t2, t4, and t6 in a case where an input image is displayed, i.e., pixel data corresponding to vertical lines displayed on a display unit 201 in frames at t0, t2, t4, and t6. The input image is a 60-Hz image, so that each interval of t0, t2, t4, and t6 is 1/60 second.

The IP converter 101 converts the interlaced signals into progressive signals. More specifically, as described with reference to FIG. 2, the IP converter 101 determines pixel values of interpolated pixels using inter-frame interpolation or intra-frame interpolation as appropriate, thereby generating progressive signals. The progressive signals are shown in part (B) of FIG. 5. As shown in part (B) of FIG. 5, original lines with original display image signals and interpolated lines without original display image signals are located alternately in the vertical direction in an image displayed at each timing. Furthermore, the original lines and the interpolated lines are also located alternately in the temporal direction.

Furthermore, the IP converter 101 doubles the frame rate of the input image signals. For example, in the case of a 60-Hz interlaced input image, the IP converter 101 generates a 60-Hz progressive image by doubling the frame rate.

A specific example of the doubling of the frame rate will be described with reference to FIG. 6. FIG. 6 is a diagram for explaining processing of signals of one image frame. Referring to FIG. 6, a frame image displayed on a display unit 251 is displayed through IP conversion of interlaced signals into a progressive image. The progressive image generated through IP conversion is composed of original lines located on every other line and intervening interpolated lines. The original lines are composed of original pixels corresponding to actual signals included in the interlaced signals, and the interpolated lines are composed of interpolated pixels having interpolated pixel values obtained by interpolation through the IP conversion.

Figure 6:
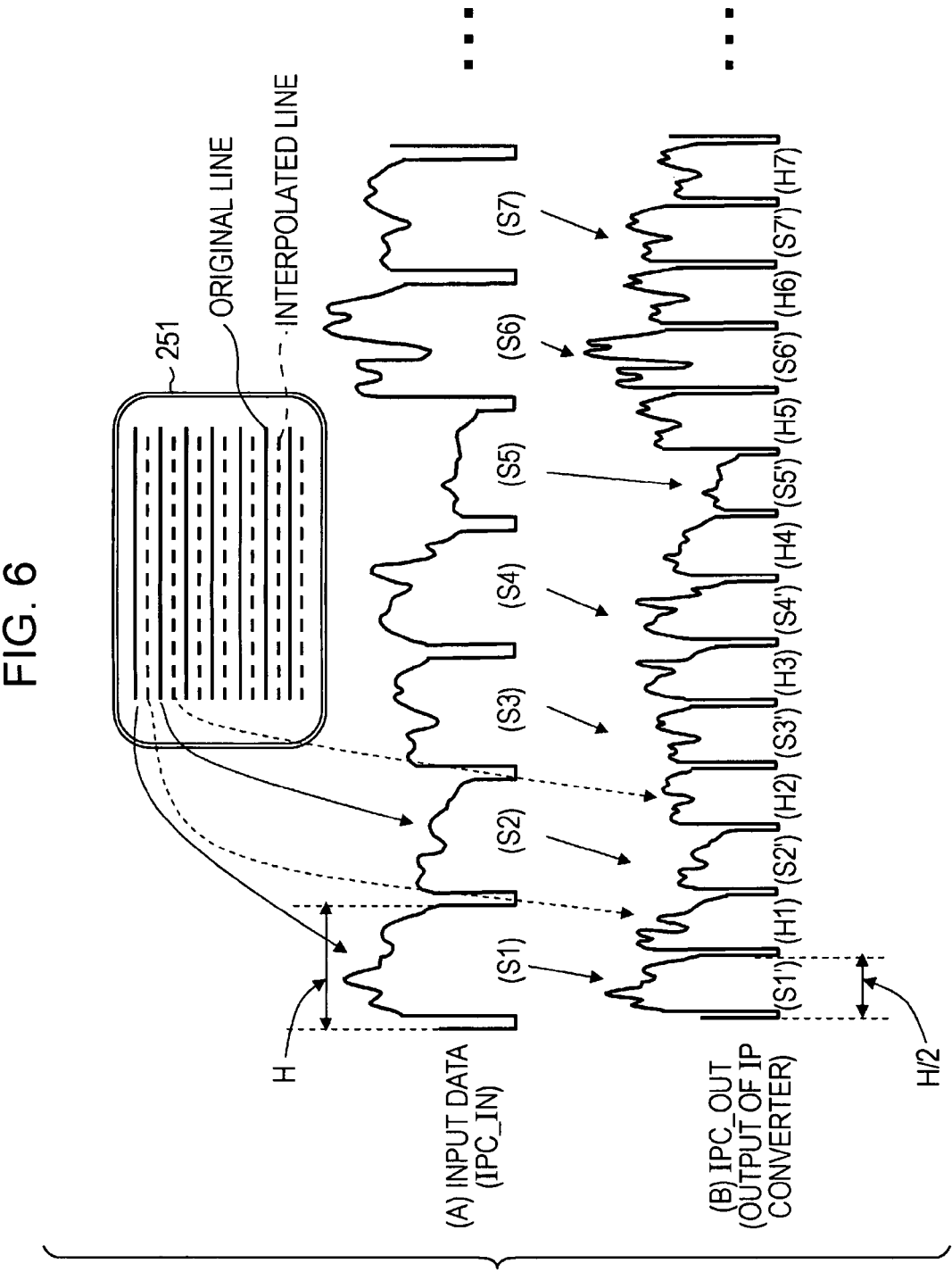
FIG. 6 is a diagram for explaining doubling of a frame rate.

Signals shown in part (A) of FIG. 6 represent luminance levels of interlaced signals. Signals S1, S2, S3, represent signal levels (luminances) of horizontal lines among the original lines. Each of the horizontal lines carries a signal having a period corresponding to a horizontal synchronization period H of the interlaced signals.

The interlaced signals are composed of signals of every other line in a frame image, as described earlier, and progressive signals are generated by adding interpolated lines not included in the interlaced signals. The IP converter 101 generates a progressive image composed of original lines and interpolated lines through IP conversion, i.e., generates a double-frame-rate progressive image. Part (B) of FIG. 6 shows data of the double-frame-rate progressive image.

Part (B) of FIG. 6 shows output signals (IPC_OUT) output from the IP converter 101 to the level converter 102 through IP conversion based on input interlaced signals and doubling of the frame rate. Signals S1', S2', S3', . . . represent signal levels (luminances) of horizontal lines among the original lines. H1, H2, H3, . . . represent signal levels (luminances) of interpolated lines. In part (B) of FIG. 6, the period of output of Sn' and the period of output of Hn each correspond to a horizontal synchronization period of output signals, represented by H/2, i.e., one half of the horizontal synchronization period H of the signals shown in part (A) of FIG. 6. That is, for example, when the input image is a 60-Hz interlaced image, the output image is a 60-Hz progressive image.

As described above, the IP converter 101 executes IP conversion and doubling of the frame rate on the basis of the input interlaced signals to output signals (IPC_OUT) shown in part (B) of FIG. 6 to the level converter 102.

The level converter 102 shown in FIG. 3 receives input of the output signals (IPC_OUT) shown in part (B) of FIG. 6, i.e., the double-frame-rate progressive signals, from the IP converter 101. Furthermore, the level converter 102 receives input of a display-period control signal (CURRENT) that is determined in accordance with the doubling of the frame rate by the IP converter 101, i.e., a control signal regarding display timing of each horizontal line. Furthermore, the level converter 102 receives input of a gain signal (GAIN) from the controller 103.

The level converter 102 receives a level setting value for each line from the controller 103, and controls the level of each line on the basis of the input information. More specifically, the level converter 102 does not execute level conversion for original lines included in the double-frame-rate progressive signals, and converts the output levels of interpolated lines within a range of ×0 to ×1.

Figure 7:
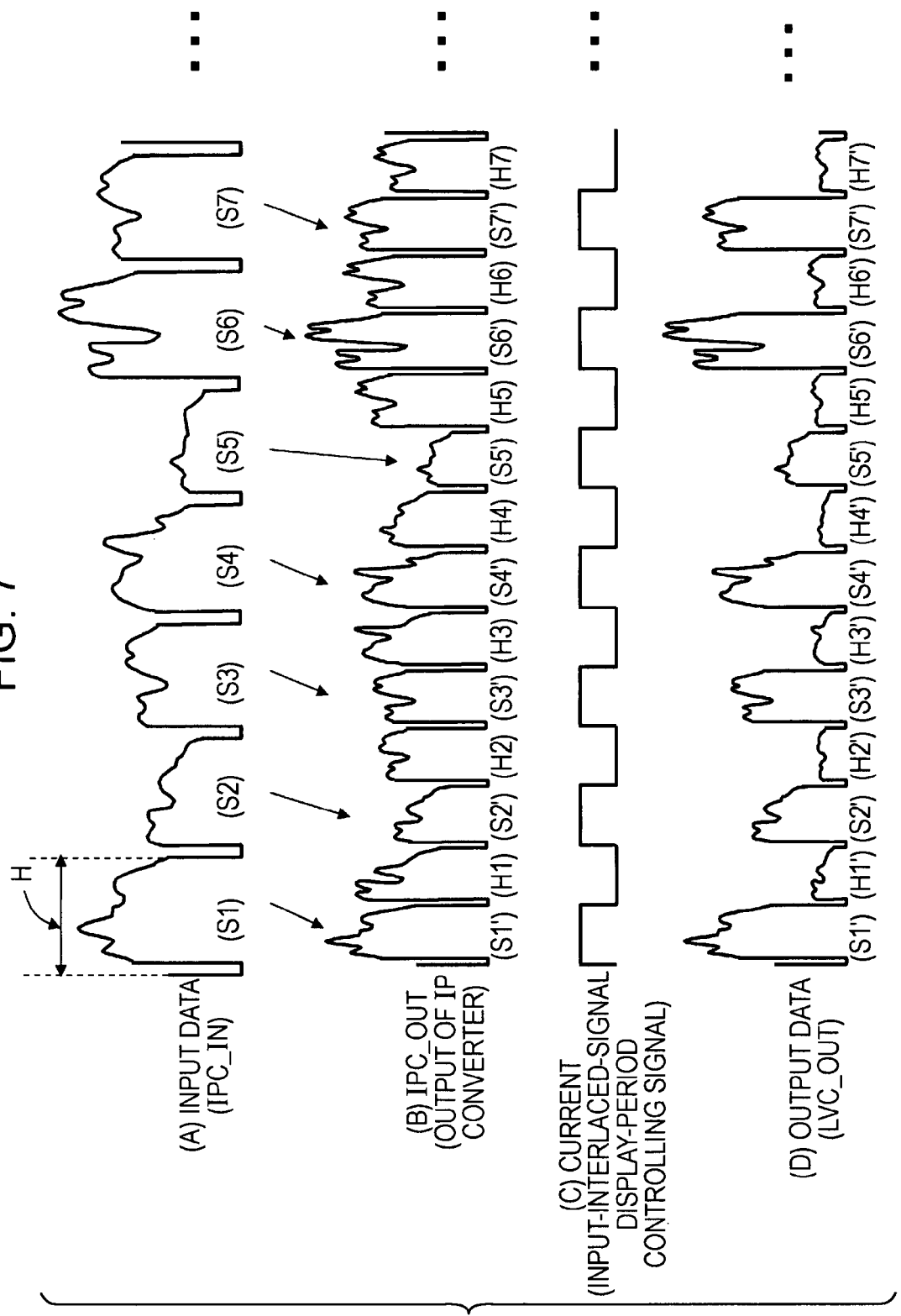
FIG. 7 is a diagram for explaining signal processing executed in the image display apparatus according to the embodiment.

Now, processing executed by the level converter 102 will be described with reference to FIG. 7. Parts (A) and (B) of FIG. 7 show signals corresponding to the signals described with reference to parts (A) and (B) of FIG. 6. That is, the signals shown in part (A) of FIG. 7 are the interlaced signals input to the IP converter 101, and the signals shown in part (B) of FIG. 7 are the IP-converter output signals (IPC_OUT), i.e., the double-frame-rate progressive signals output from the IP converter 101.

Part (C) of FIG. 7 shows a display-period control signal (CURRENT) that is determined in accordance with the doubling of the frame rate by the IP converter 101, i.e., a control signal (CURRENT) regarding display timing of each horizontal line.

Part (D) of FIG. 7 shows output data (LVC_OUT) generated by level conversion by the level converter 102 and output from the level converter 102. The level converter 102 controls the output levels of interpolated lines included in the double-frame-rate progressive signals, on the basis of gain signals (GAIN) input from the controller 103. More specifically, the level converter 102 adjusts the output levels of the interpolated lines within a range of 0% to 100% (×0 to ×1 of the input signal levels), thereby controlling the levels so as to mainly reduce the levels.

The output data (LVC_OUT) shown in part (D) of FIG. 7 is an example of output data in a case where the level conversion ratio=0.25. In this case, the level converter 102 reduces the output levels of the interpolated lines included in the double-frame-rate progressive signals shown in part (B) of FIG. 7 to 25%, thereby generating and outputting the output data (LVC_OUT) shown in part (D) of FIG. 7. The output signals are output to a frame-holding display unit implemented by an LCD or an organic EL display.

The level conversion ratio, i.e., gain setting information, can be input via the user input unit 104 shown in FIG. 3. As the gain setting information, an arbitrary value in the range of 0 to 1 can be chosen. The controller 103 inputs the gain setting information to the level converter 102, and the level converter 102 controls the output levels of the interpolated lines included in the double-frame-rate progressive signals on the basis of the gain setting information.

Now, processing executed by the level converter 102 will be described with reference to FIG. 4. As shown in FIG. 4, the level converter 102 includes the signal selector 121 and the multiplier 122. The signal selector 121 receives input of a display-period control signal (CURRENT) shown in part (C) of FIG. 7, i.e., a control signal (CURRENT) regarding display timing of each horizontal lie, fixed gain information associated with original lines, having a value of 1, and variable gain information associated with interpolated lines, having a value in the range of 0 to 1 input from the user input unit 104. The signal selector 121 outputs a value of 1 to the multiplier 122 at an output timing of each original line, and outputs a value of the gain in the range of 0 to 1 set by the user at a timing of output of each interpolated line.

The multiplier controls the levels of the IP-converter output signals (IPC_OUT) input thereto from the IP converter 101, i.e., the double-frame-rate progressive signals shown in part (B) of FIG. 7, on the basis of the signals input from the signal selector 121. In the case of an original line, the multiplier outputs the input signal as it is using a gain having a value of 1. On the other hand, in the case of an interpolated line, the multiplier adjusts the output level of the interpolated line to 0% to 100% of the input signal level using the gain having a value in the range of 0 to 1. When the gain setting is 0.25, the output levels of the output signals for the interpolated lines included in the double-frame-rate progressive signals are reduced to 25%, as in the output data (LVC_OUT) shown in part (D) of FIG. 7.

As described above, it is possible to set an arbitrary value in the range of 0 to 1 via the user input unit 104 shown in FIG. 3. When a value of 1 is set as the gain, the interpolated line signal generated by the IP converter 101 is maintained as it is, as shown in part (D1) of FIG. 8. When a value of 0 is set as the gain, the interpolated line signal is not displayed (i.e., results in a black pixel), as shown in part (D) of FIG. 8. This allows displaying reproduced original interlaced signals.

As described above, according to this embodiment, in an arrangement where interlaced signals are converted into progressive signals for output, it is allowed to control the output levels of interpolated lines. For example, when a value of 1 is set as the gain, a progressive image generated by IP conversion can be output as it is without reducing the levels of interpolated lines. In this case, flicker and reduction of luminance can be alleviated. This serves to progressive images in such a manner that the ease of visual recognition is improved and that signals can be recognized with reduced burden.

On the other hand, when a value of 0 is set as the gain, the pixel values of interpolated lines generated by interpolation are not output, i.e., black pixels are output in place of the interpolated lines. This allows an image corresponding to input interlaced signals themselves. An arbitrary value in the range of 0 to 1 can be set as the gain, so that the user can select and display a desired image.

As described above, the user can set a desired value as the level conversion ratio used in the level converter 102 via the user input unit 104. When the setting is ×0, black pixels are output in place of interpolated pixels, so that an image reflecting an original interlaced image can be displayed. On the other hand, when the setting is ×1, the pixel values of interpolated pixels generated by IP conversion are output, so that a progressive image generated by IP conversion can be displayed.

Figure 9:
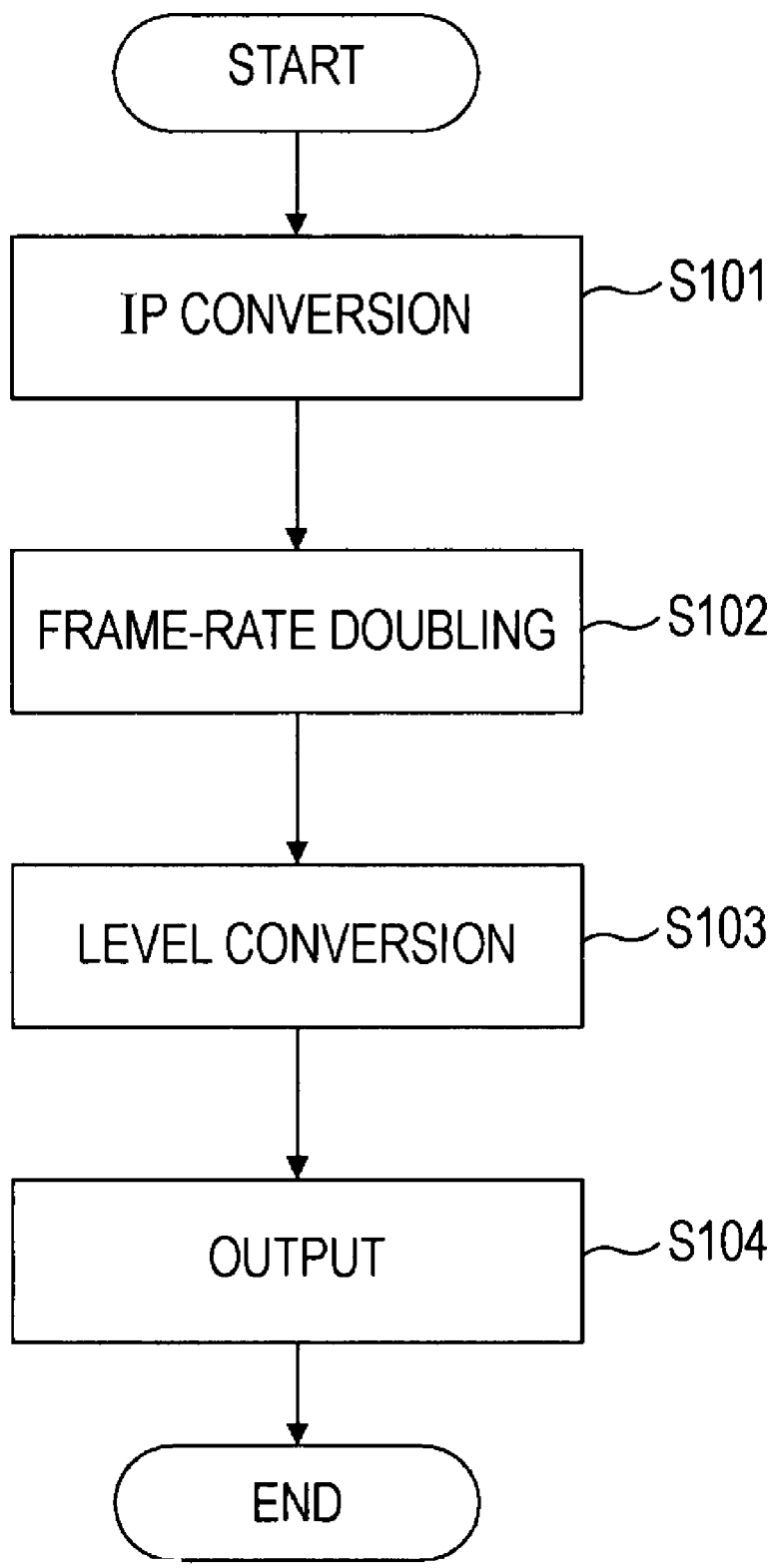
FIG. 9 is a flowchart showing a sequence of processing executed in the image display apparatus according to the embodiment.

Lastly, a sequence of processing executed in the image display apparatus according to this embodiment will be described with reference to a flowchart shown in FIG. 9. The processing according to the flow shown in FIG. 9 is executed by the image display apparatus shown in FIG. 3. The overall processing is controlled by the controller 103 shown in FIG. 3. For example, the controller 103 includes a central processing unit (CPU) that controls processing according to a computer program stored in a memory.

Processing in the individual steps of the flowchart shown in FIG. 9 will be described below. First, in step S101, IP conversion is executed to convert interlaced signals into progressive signals. The IP conversion is executed by the IP converter 101 described with reference to FIG. 3.

Then, in step S102, the frame rate of progressive signals (e.g., 60-Hz image signals) is doubled. That is, as described with reference to FIG. 6, for example, the frame rate of a 60-Hz interlaced input image and interpolated image signals generated by IP conversion in step S101 is doubled to generate a 60-Hz progressive image. This processing is also executed by the IP converter 101 described with reference to FIG. 3. The IP conversion in step S101 and the doubling of the frame rate in step S102 may be executed either sequentially or simultaneously.

Then, in step S103, the level converter 102 executes level conversion. The level converter 102 controls the output levels of interpolated lines included in the double-frame-rate progressive signals on the basis of gain signals (GAIN) input from the controller 103. More specifically, the level converter 102 adjusts the output levels of the interpolated lines in the range of 0% to 100% mainly to reduce the output levels. In step S104, signals obtained through the processing described above are output as output data (LVC_OUT).

Figure 8:
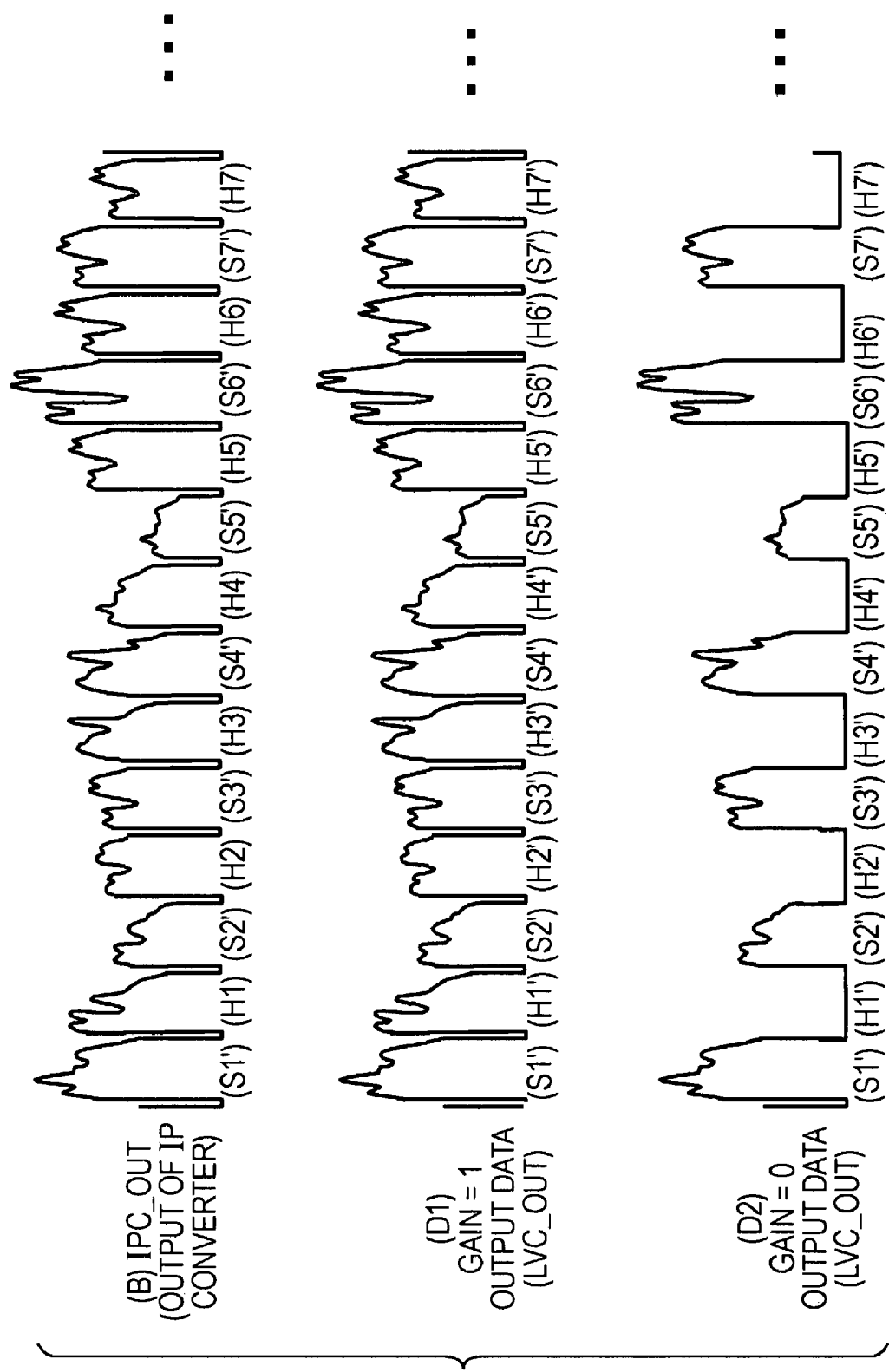
FIG. 8 is a diagram for explaining an example of signal processing and output signals in the image display apparatus according to the embodiment.

The data displayed as a result corresponds to the data described earlier with reference to part (D) of FIG. 7 or parts (D1) and (D2) of FIG. 8. That is, the signals have levels obtained by adjusting the levels of data of the interpolated line in the range of 0% to 100% according to the setting. The amount of level reduction in the level converter 102 can be set via the user input unit. When the setting is ×0, black pixels are output in place of interpolated pixels, so that an image reflecting the original interlaced image can be viewed. When the setting is ×1, pixel values of interpolated pixels generated by IP conversion are output as they are, so that a progressive image generated by IP conversion can be viewed.

Although the embodiment is described above in the context of an example where a 60-Hz interlaced image is input and a 60-Hz progressive image is output through doubling of the frame rate, the combination of an input image and an output image is not limited to this example. For example, it is possible to generate a 50-Hz progressive image from a 50-Hz interlaced image through doubling of the frame rate and to display the 50-Hz progressive image. Regardless of the setting, original lines and interpolated lines are displayed alternately, and by controlling the levels of the interpolated lines, various images ranging from a progressive image to an interlaced image can be displayed.

The present invention has been described in detail in the context of specific embodiments. However, obviously, it is possible for those skilled in the art to make modifications or alternatives without departing from the spirit of the present invention. That is, the present invention has been disclosed by way of examples, and the present invention should not be construed as limited to the embodiments. The scope of the present invention should be determined on the basis of the claims.

The series of processes described herein can be executed by hardware, by software, or by combination of hardware and software. When the series of processes is executed by software, a program defining the processing sequence is executed by installing the program in a memory of a computer embedded in special hardware or on a general-purpose computer that is capable of executing various processes.

For example, the program may be recorded in a recording medium such as a hard disc or a read-only memory (ROM). Alternatively, the program may be stored (recorded) temporarily or permanently on a removable recording medium such as a flexible disc, a compact disc read-only memory (CD-ROM), a magneto-optical (MO) disc, a digital versatile disc (DVD), a magnetic disc, or a semiconductor memory. Such a removable medium can be provided in the form of what is called package software.

Instead of installing the program from a removable recording medium to a computer, the program may be transferred by wireless from a download site to a computer, or transferred by wire to a computer via a network such as a local area network (LAN) or the Internet, so that the computer can receive the program transferred and install the program on an internal recording medium such as a hard disc.

The various processes described herein need not necessarily be executed sequentially in the orders described, and may be executed in parallel or individually as needed or in accordance with the processing ability of an apparatus that executes the processes. A system in this specification refers to a logical combination of a plurality of apparatuses, irrespective of whether individual constituent components are provided within the same case.

What is claimed is:

1. An image display apparatus comprising:
    an interlaced-to-progressive converter configured to receive input of interlaced signals and to convert the interlaced signals into progressive signals including interpolated pixels generated by interpolation;
    a level converter configured to adjust output levels of the interpolated pixels included in the progressive signals generated by the interlaced-to-progressive converter; and
    a display unit employing a frame-holding display method, configured to output an image obtained through the level conversion by the level converter,
    wherein the level converter includes
        a signal selector configured to output gains associated with output periods of original lines corresponding to the input interlaced signals and interpolated lines composed of interpolated pixel signals, according to control signals associated with individual output line display periods at the display unit, and
        a multiplier configured to convert levels of the signals output from the interlaced-to-progressive converter, according to the gains output from the signal selector.

2. The image display apparatus according to claim 1, wherein the interlaced-to-progressive converter is configured to execute frame-rate up-conversion of input image signals by a factor of n to generate progressive signals having a frame rate increased by a factor of n, where n is an integer greater than or equal to two.

3. The image display apparatus according to claim 1, further comprising:
a user input unit configured to allow input a setting value for setting an execution level of the adjustment of the output levels by the level converter,
wherein the level converter is configured to adjust the output levels of the interpolated pixels according to the setting value input via the user input unit.

4. The image display apparatus according to claim 1, wherein the level converter is configured to adjust the output levels of the interpolated pixels included in the progressive signals generated by the IP converter within a range of 0% to 100% of input levels thereof.

5. The image display apparatus according to claim 1, wherein the display unit employing the frame-holding display method is formed of a liquid crystal display or an organic electroluminescence display.

6. A signal processing apparatus that generates image signals, the signal processing apparatus comprising:
an interlaced-to-progressive converter configured to receive input of interlaced signals and to convert the interlaced signals into progressive signals including interpolated pixels generated by interpolation; and
a level converter configured to adjust output levels of the interpolated pixels included in the progressive signals generated by the interlaced-to-progressive converter,
wherein the level converter includes
a signal selector configured to output gains associated with output periods of original lines corresponding to the input interlaced signals and interpolated lines composed of interpolated pixel signals, according to control signals associated with individual output line display periods at the display unit, and
a multiplier configured to convert levels of the signals output from the interlaced-to-progressive converter, according to the gains output from the signal selector.

7. The signal processing apparatus according to claim 6, wherein the interlaced-to-progressive converter is configured to execute frame-rate up-conversion of input image signals by a factor of n to generate progressive signals having a frame rate increased by a factor of n, where n is an integer greater than or equal to two.

8. The signal processing apparatus according to claim 6, wherein the level converter is configured to adjust the output levels of the interpolated pixels according to a setting value input via a user input unit.

9. The signal processing apparatus according to claim 6, wherein the level converter is configured to adjust the output levels of the interpolated pixels included in the progressive signals generated by the IP converter within a range of 0% to 100% of input levels thereof.

10. An image processing method for image processing executed by an image display apparatus, the image processing method comprising the steps of:
causing an interlaced-to-progressive converter to receive input of interlaced signals and to convert the interlaced signals into progressive signals including interpolated pixels generated by interpolation; and
causing a level converter to adjust output levels of the interpolated pixels included in the progressive signals to thereby generate signals that are output to a display wherein the level converter includes a signal selector configured to output gains associated with output periods of original lines corresponding to the input interlaced signals and interpolated lines composed of interpolated pixel signals, according to control signals associated with individual output line display periods at the display unit, and a multiplier configured to convert levels of the signals output from the interlaced-to-progressive converter, according to the gains output from the signal selector.

11. A non-transitory computer readable medium comprising a computer program product for causing an image display apparatus to execute image processing, the computer program product comprising the steps of:
causing an interlaced-to-progressive converter to receive input of interlaced signals and to convert the interlaced signals into progressive signals including interpolated pixels generated by interpolation; and
causing a level converter to adjust output levels of the interpolated pixels included in the progressive signals to thereby generate signals that are output to a display,
wherein the level converter includes
a signal selector configured to output gains associated with output periods of original lines corresponding to the input interlaced signals and interpolated lines composed of interpolated pixel signals, according to control signals associated with individual output line display periods at the display unit, and
a multiplier configured to convert levels of the signals output from the interlaced-to-progressive converter, according to the gains output from the signal selector.

* * * * *